INVENTORS
A. R. ANDERSON,
R. C. CARLSON, JR.,
C. W. HIGGINS &
N. F. SMITH
BY R. P. Miller
Attorney

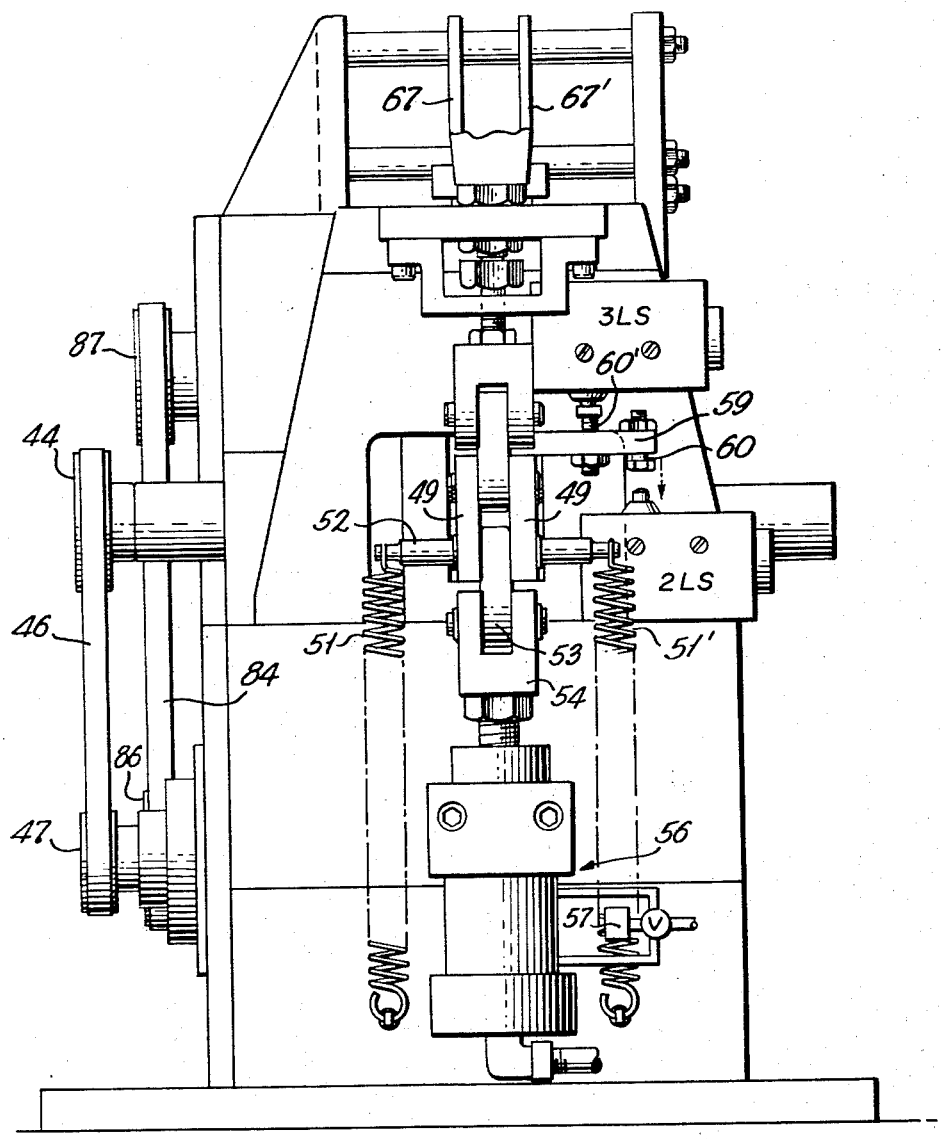

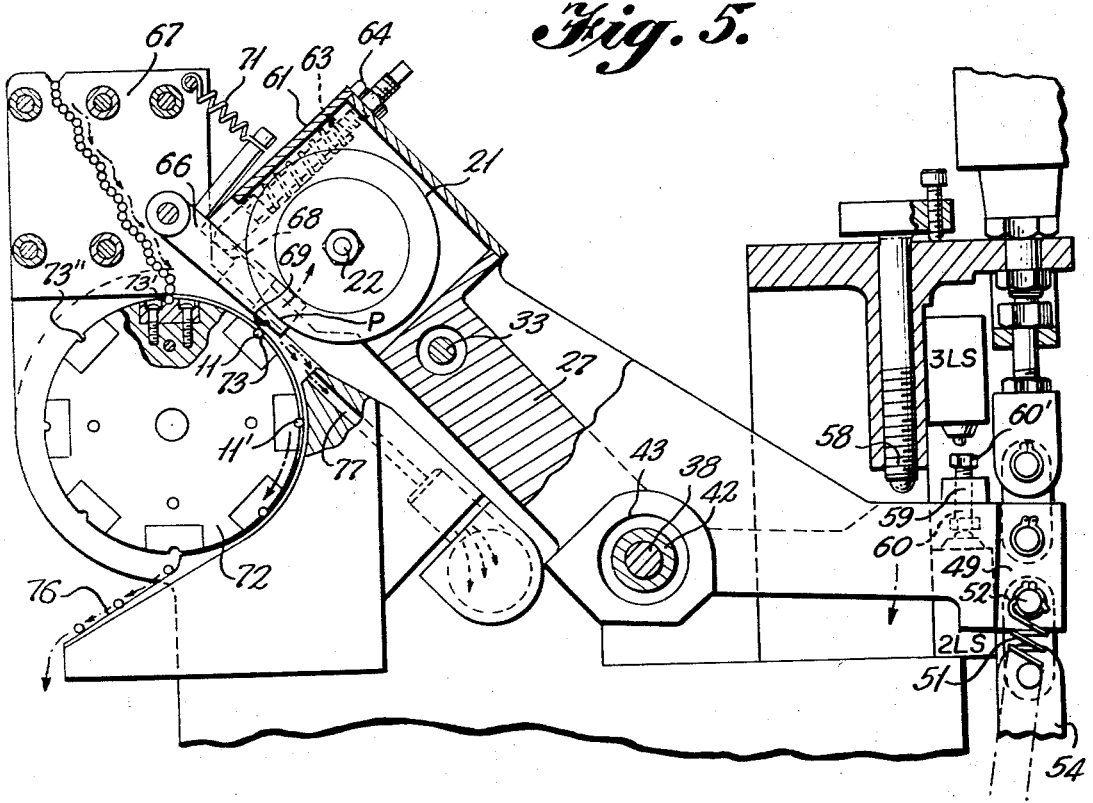
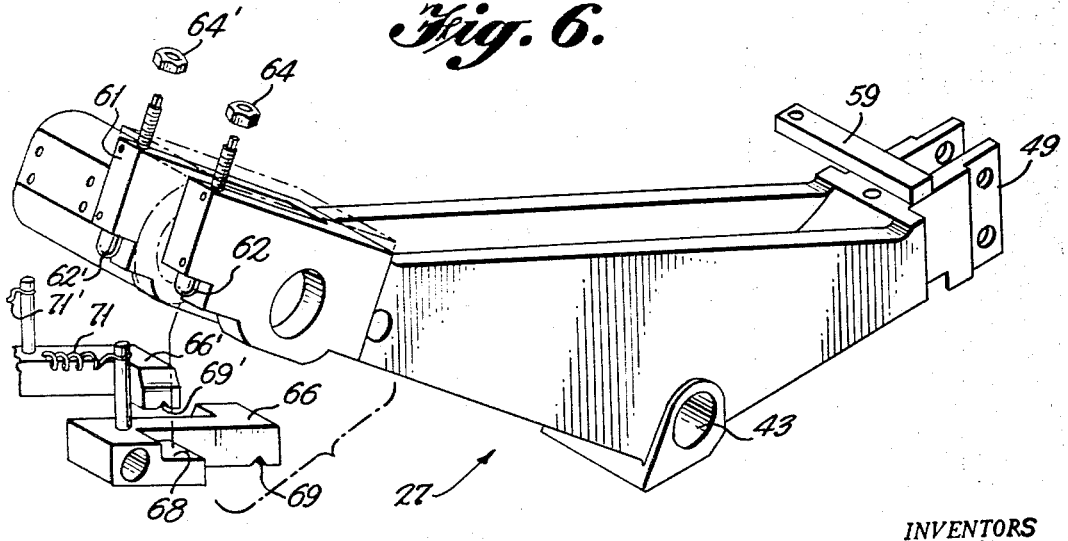

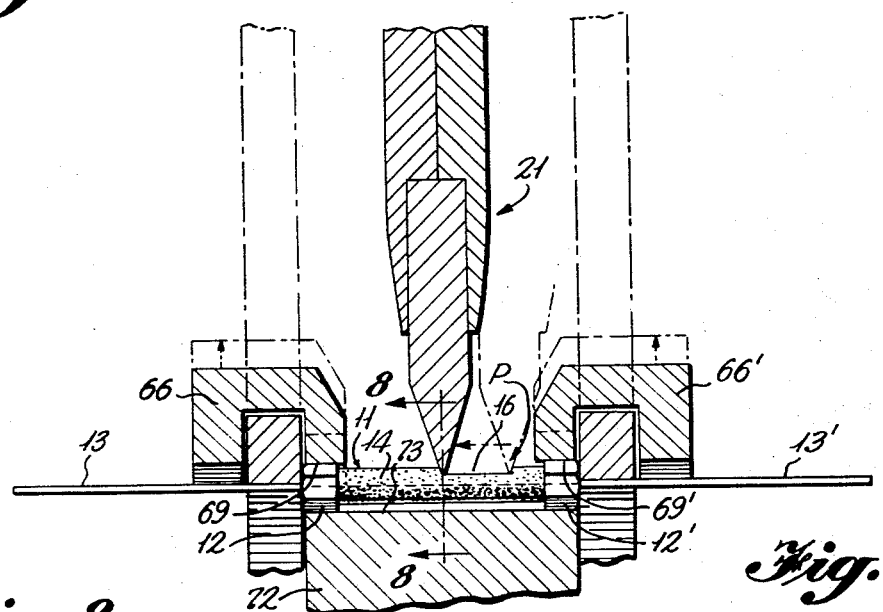
Fig. 7.
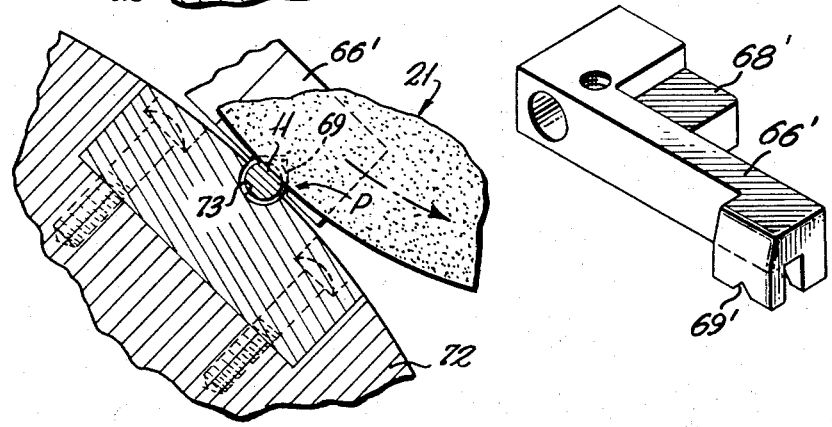
Fig. 8.
Fig. 10.
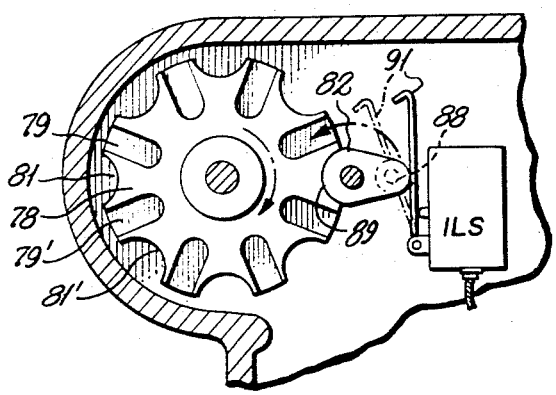
Fig. 9.
INVENTORS
A. R. ANDERSON,
R. C. CARLSON, JR.,
C. W. HIGGINS &
N. F. SMITH
BY R. P. Miller
Attorney

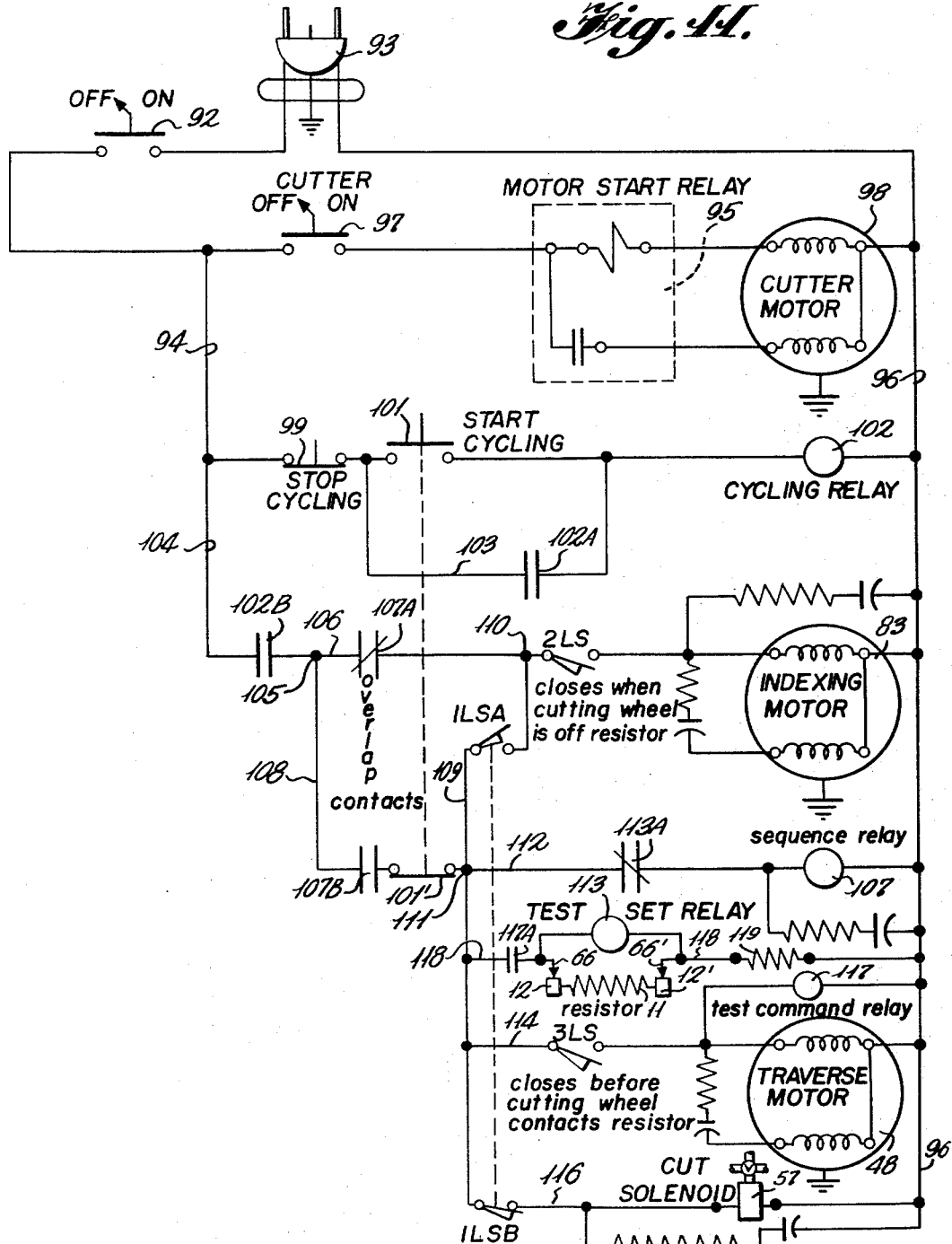

United States Patent Office 3,418,759
Patented Dec. 31, 1968

3,418,759
APPARATUS FOR MAKING SLAB CUTS IN RESISTOR FILMS
Albin R. Anderson, Lowell, Roy C. Carlson, Jr., Boxford, Mass., Charles W. Higgins, Salem, N.H., and Norman F. Smith, Methuen, Mass., assignors to Western Electric Company, Incorporated, New York, N.Y., a corporation of New York
Filed Aug. 8, 1966, Ser. No. 571,066
7 Claims. (Cl. 51—37)

ABSTRACT OF THE DISCLOSURE

Apparatus for making slab cuts in resistor films includes a rotating cutting wheel mounted to move transversely on an arm. The arm is pivoted toward one of several resistors held on a support wheel. A pair of contact fingers, coupled to a testing circuit, lead the cutting wheel to engage the resistor as the arm is pivoted. At a predetermined measured resistance value, prior to or during cutting, the pivot arm is moved away from the tested resistor. A Geneva wheel, driven by a pin gear, then indexes the support wheel and moves another resistor into cutting position.

---

This invention relates to apparatus for making slab cuts in resistor films, and more particularly to apparatus of this type wherein a cutting mechanism pivots about a bearing sleeve through which passes a drive for traversing the cutting mechanism, and wherein cutting will proceed only after a determination by a test set that a resistor to be cut has an initial resistance value which is below a desired level.

It has been found that a particularly high degree of accuracy may be obtained in adjusting coated resistors to a desired value by making slab-shaped cuts in the films deposited thereon. It is desirable to engage a cutting mechanism with the film on a resistor only upon a determination that the resistance of the film is below the final resistance level sought. It is desirable, also, that the cutting mechanism be compact and yet operate reliably and efficiently. It is, moreover, desirable to provide a reliable resistor indexing mechanism, capable of intermittent operation, which mechanism does not include a clutch assembly.

It is, therefore, an object of this invention to provide a new and improved apparatus for making slab cuts in resistor films upon determination that the film on each resistor to be cut is initially of a resistance lower than a desired value.

It is another object of this invention to provide in such an apparatus a compact arrangement for supporting a cutting mechanism wherein the cutting mechanism can pivot about a bearing sleeve to contact a resistor having below the desired resistance value and wherein the cutting mechanism will traverse along the resistor, driven by an element which passes through the bearing sleeve, until the desired resistance value is reached.

It is a further object of this invention to provide in such apparatus a new and improved resistor indexing mechanism which is capable of intermittent operation and which does not include a clutch assembly.

With these and other objects in view, the invention contemplates a cutting wheel mounted on a cutting wheel support arm which pivots about a bearing sleeve. A drive shaft passes through the bearing sleeve and is connected to drive a traverse cam, mounted on the cutting wheel support arm, for moving the cutting wheel longitudinally along the surface of a resistor in a cutting position. A pair of fingers lead the cutting wheel in pivoting toward the resistor and contact a pair of end caps on the resistor, measuring the resistance across the resistor through a test set mechanism. If the resistance is at least equal to the desired final value, the cutting wheel is pivoted away from the resistor and does not contact its surface; otherwise it cuts the resistor to value. A resistor support wheel is indexed between successive peripheral resistor nests by a Geneva wheel, which is in turn driven by a pin gear. A pin on the pin gear strikes a limit switch operating arm when the resistor support wheel is locked in a dwell position, opening the limit switch to interrupt current flow to an indexing motor, which operates the pin gear. Each indexing movement is thereby terminated without the need for disengaging a clutch.

Other objects and advantages of the invention will be apparent from the following detailed description when considered in conjunction with the drawing, wherein:

FIG. 1 is a side view of an apparatus for making slab cuts in resistor films in accordance with the principles of the invention;

FIG. 2 is an end view of the apparatus of FIG. 1, showing an assembly for pivoting a cutting wheel support arm about a sleeve bearing;

FIG. 5 is a side view, with parts broken away, of the cutting wheel support arm, withdrawn from cutting position, and of a resistor support wheel;

FIG. 6 is an exploded view, in perspective, of the cutting wheel support arm, with the cutting wheel removed, and of portions of a pair of fingers mounted adjacent thereto;

FIG. 7 is a sectional end view of a resistor being cut by the cutting wheel;

FIG. 8 is a side view, partly in section, showing a finger contacting an end cap of a resistor on the resistor support wheel;

FIG. 9 is a side view of an indexing mechanism used in the apparatus;

FIG. 10 is a perspective view of one of the fingers; and

FIG. 11 is a simplified schematic diagram of an electric circuit used to control the apparatus.

Figure 4:
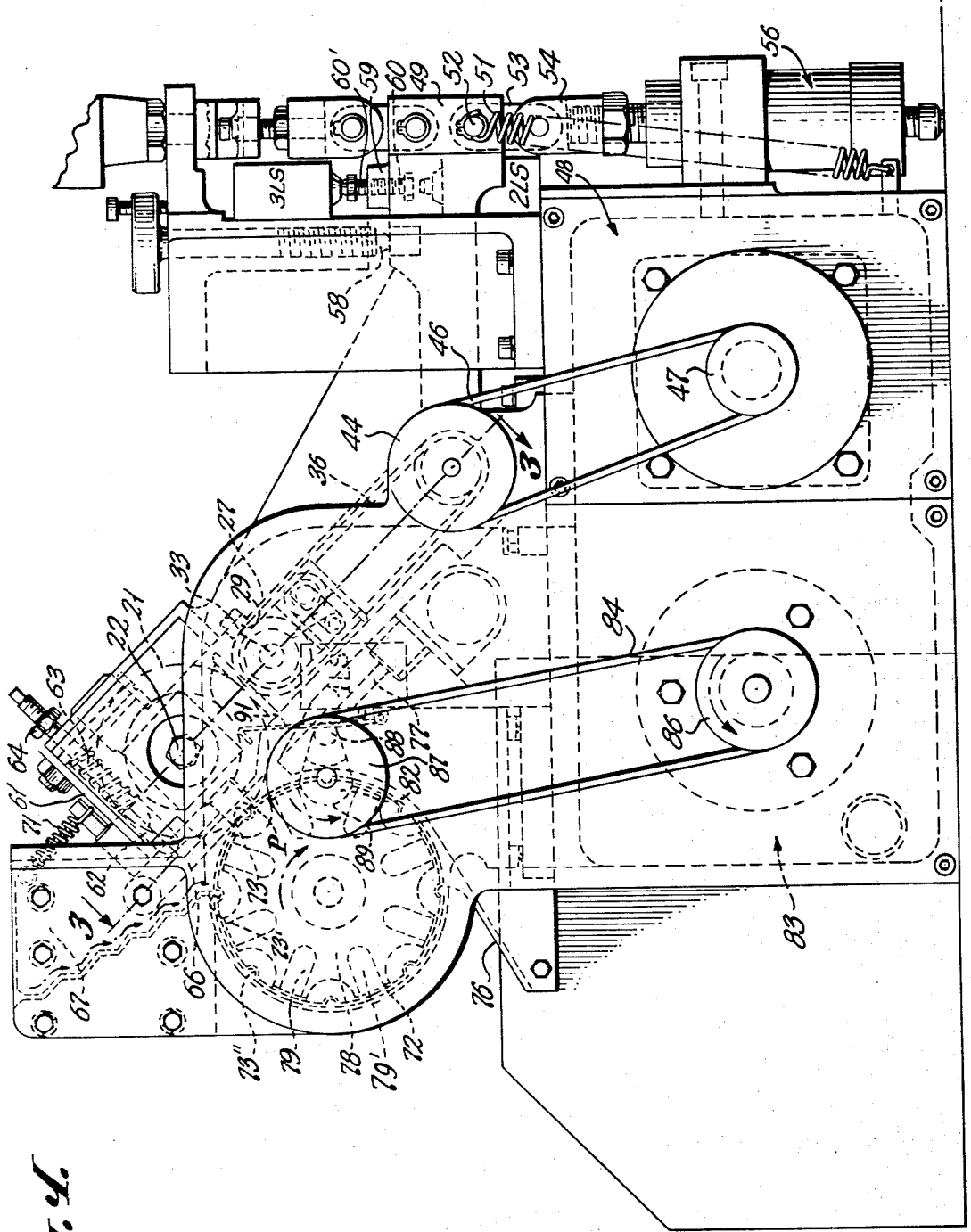
FIG. 4 is a perspective view of an uncut and a cut resistor, the latter having undergone cutting by the apparatus of the invention.
Figure 3:
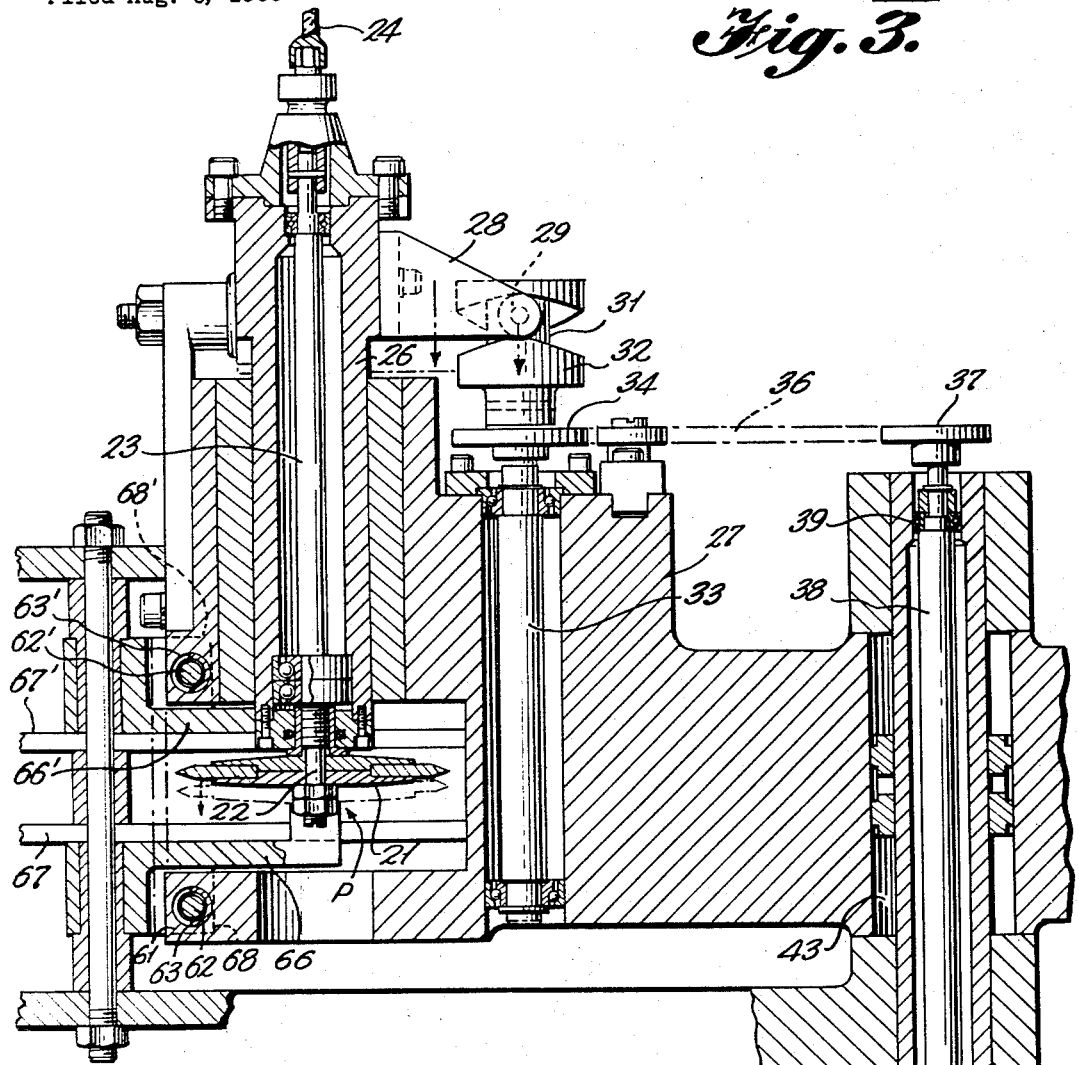
FIG. 3 is a sectional view taken along the line 3—3 of FIG. 1, showing a portion of the cutting wheel support arm.
Figure 4:
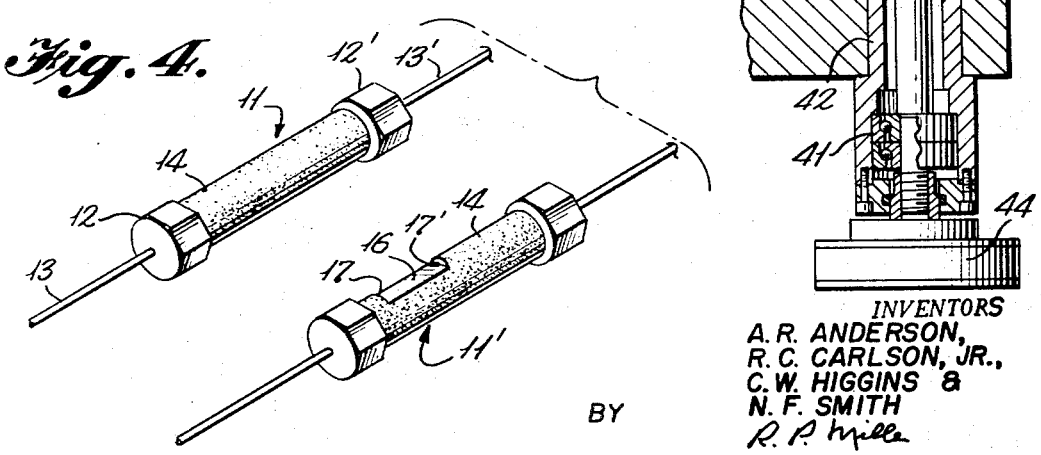

Referring now to FIG. 4 of the drawings, there is shown an uncut resistor 11 of generally cylindrical shape having a pair of end caps 12 and 12'. A pair of lead wires 13 and 13' extend axially outward from the end caps. The resistor is composed of a ceramic core upon which there has been deposited a carbon resistance film 14 between the end caps 12 and 12'. With the unbroken resistance film 14 covering the ceramic core, the resistor 11 has a resistance of less than a desired value.

A finished resistor 11', generally similar to the uncut resistor 11, is also depicted in FIG. 4. The finished resistor 11' differs from resistor 11 in that a longitudinal slab has been cut from a portion 16 of the carbon film 14. Due to the presence of this slab cut in the film, the resistance of resistor 11' is greater than that of resistor 11 and is equal to the desired value. The removal of carbon film from the longitudinal slab portion 16 has decreased the area of the carbon film 14 surrounding the slab cut, restricting the path through which current can flow. The total resistance path across the carbon film increases with increasing length of this slab cut, since the lengthening of the cut elongates the restriction in the surrounding area through which current can flow, with a resultant increase in its effect upon the resistance across the entire resistor. Cutting of the slab defining portion 16 was begun at an end 17 of the portion and was ceased at a point 17' when the desired resistance across the resistor 11' was obtained. The location of the slab portion 16 may be at any longitudinal position along the resistor film between the end caps. A slab cut in a subsequent resistor, for example, might be begun at the point 17' and be continued along the length of the resistor. It is not necessary to return to the position of end 17 to begin cutting again.

An apparatus for cutting the longitudinal slab in portion 16 of the carbon film on resistor 11 is shown in FIGS. 1–3 and 5–10. A cutting wheel 21 (see FIGS. 3, 5, and 7) which has an abrasive surface for grinding away the carbon film 14, has its center 22 mounted on a rotary cutting wheel shaft 23. The shaft 23 is connected to a flexible drive shaft from a cutting wheel drive motor, shown schematically in FIG. 11 and designated by the numeral 98, by a coupling 24. Thus, rotation of the cutting wheel drive motor will rotate the cutting wheel 21. The shaft 23 is mounted for rotation in a shaft housing 26. The shaft housing is carried by a cutting wheel support or frame arm 27, best shown in FIG. 6, so as to permit shaft 23 to reciprocate along its own axis, enabling the cutting wheel 21 to traverse, cutting a longitudinal slab in a resistor at a cutting position P (see FIG. 7). A follower arm 28 (see FIG. 3) projects transversely from shaft housing 26 and carries a follower 29. Follower 29 rides in a cam groove 31 on a traverse cam 32 mounted on a rotary cam shaft 33. Cam 32 and its groove 31 are so designed that rotation of the cam shaft 33 will cause follower 29, follower arm 28, shaft housing 26, shaft 23 and saw 21 all to reciprocate along the axis of shaft 23.

Cam shaft 33 extends parallel to shaft 23. The cam shaft is mounted for rotation in the cutting wheel support arm 27 and carries a pulley 34. The pulley 34 is driven by a belt 36 from a second pulley 37 mounted on a drive shaft 38. Drive shaft 38 is mounted for rotation in bearings 39 and 41. The bearings are, in turn, mounted within a hollow bearing sleeve 42. The cutting wheel support arm 27 has a bore 43 extending therethrough parallel to shaft 23 and cam shaft 33. The bearing sleeve 42 is mounted within bore 43, with the arm 27 free to pivot about the bearing sleeve. Cutting contact between the cutting wheel 21 and a resistor in the cutting position P will occur when the cutting wheel support arm 27 is pivoted about bearing sleeve 43 to the cutting position. An additional pulley 44 is located on drive shaft 38 to rotate the shaft when driven by a belt 46 (see FIG. 1). The belt 46 is connected to a pulley 47 which is rotated by a cutting wheel traverse motor 48.

The cutting wheel support arm 27 has a forked end 49 (see FIGS. 1, 5 and 6). A pair of springs 51 and 51' may be connected to a cross-member 52 extending through the forked end 49, the springs biasing the arm 27 to a position in which the cutting wheel 21 is pivoted away from the cutting position P. Also connected to cross-member 52, by suitable linkage such as that shown at 53 and 54, is the piston of a pneumatic cylinder and piston assembly 56. A valve V, shown schematically in FIG. 2, actuated by a cut solenoid 57 (see also FIG. 11), is associated with the assembly 56 and may be operated to control the air supply thereto. The pneumatic cylinder and piston assembly 56 will operate to oppose the bias of springs 51 and 51' on the cutting wheel support arm 27, pivoting the cutting wheel to the cutting position P, when the solenoid 57 is energized. An adjustable stop 58 may be suitably positioned adjacent the cutting wheel support arm 27 to control the extent to which the cutting wheel 21 can pivot toward cutting position P, thereby determining the depth of the slab cut.

A projecting portion 59, best shown in FIG. 2, extends outwardly from the forked end 49 of the cutting wheel support arm 27. This projecting portion may be integral with the arm 27 or may be attached thereto. A pair of limit switches 2LS and 3LS are located adjacent the projecting portion 59. Switch 2LS is positioned to be closed by projecting portion 59 when the cutting wheel support arm 27 pivots about the bearing sleeve 42 sufficiently far to move cutting wheel 21 away from a resistor in the cutting position P. Switch 3LS is positioned to be closed by the projecting portion 59 when the arm 27 pivots about the bearing sleeve 42 to bring the cutting wheel 21 into contact with the carbon film on a resistor in cutting position P. A pair of limit switch actuating members 60 and 60' are carried on the projecting portion 50. These may incorporate spring loaded shock absorbers which compensate for any adjustment of the arm 27 by the stop mechanism 58 and prevent damage to the limit switches 2LS and 3LS.

Looking at FIGS. 5 and 6, at the end 61 of the cutting wheel support arm 27 there are shown on either side of the cutting wheel 21 a pair of pusher rods 62 and 62'. The pusher rods extend transversely through the arm 27 and are reciprocable therein. A pair of springs 63 and 63' bias the pusher rods 62 and 62' in a direction to lead the cutting wheel support arm 27 in pivoting toward the cutting position P. Suitable stop nuts 64 and 64' are used to limit the movement of the pusher rods under influence of the springs.

A pair of electrically conductive fingers 66 and 66', best shown in FIGS. 5, 6 and 10, are pivotally mounted adjacent the pusher rods 62 and 62' on a pair of plates 67 and 67', FIG. 5. Each finger has a shoulder portion 68 or 68' which is positioned to be engaged by one of the pusher rods. Each rod contacts the shoulder portion of its associated finger to pivot the finger and engage a notched portion 69 or 69' thereof with an end cap 12 or 12' of a resistor in the cutting position P as the cutting wheel support arm 27 is pivoted toward the cutting position. The fingers 66 and 66' are suitably biased away from cutting position P, as by springs at 71 and 71'. The notched portions 69 and 69' of the fingers contact the end caps prior to the cutting wheel 21 contacting the resistor. The fingers 66 and 66' thus act as electrical contacts connected across the resistor. Further pivoting of the arm 27 first brings the projecting portion 57 into contact with switch 3LS to close it and then engages the cutting wheel with the resistor surface. As the arm 27 pivots, the springs 63 and 63' are compressed.

As illustrated in FIGS. 1 and 5, the resistor 11 to be cut is supported in the cutting position P on a resistor support wheel 72. A plurality of resistor nests are equally spaced about the periphery of wheel 72, as at 73, 73' and 73". The resistor nest 73 is shown supporting a resistor 11 in the cutting position P. The resistor nest 73', best shown in FIG. 5, is shown in a position for receiving an uncut resistor from any suitable feed means, such as a pair of feeding slots formed in between plates 67 and 67'. The resistor nest 73" is shown empty. Completely cut or slabbed resistors may be fed by the resistor support wheel 72 to a chute 76 after cutting. Suction may be introduced adjacent cutting position P, as at 77, to draw off cutting waste products.

A Geneva wheel 78 is rotatably mounted, coaxially with resistor support wheel 72 to drive the wheel 72. Extending inwardly from the periphery of the Geneva wheel 78, and equally spaced thereabout, are a plurality of slots, such as slots 79 and 79', equal in number to the resistor nests. As shown in FIG. 9, a plurality of semicircular recesses, such as 81 and 81', are centrally spaced between adjacent slots. The rotation of Geneva wheel 78 through the angular distance between two adjacent slots will drive the resistor support wheel 72 through the angular distance between the equally spaced resistor nests, thereby moving a cut resistor out of the cutting position P and moving an uncut resistor into the cutting position P to replace it.

The Geneva wheel 78 is itself driven by a rotatably mounted pin gear 82. A commercially available, low speed, synchronous A.C. motor 83 (see FIG. 1) of the permanent-magnet type is used as an indexing motor. This type of motor has instant start and stop characteristics, so that coasting is almost negligible upon deenergization and no brake need be used. The indexing motor is suitably connected to drive the pin gear, as through a belt 84, interconnecting a pair of pulleys 86 and 87. No complex gear reduction mechanisms are required, due to the low speed operation of the motor. The pin gear 82 carries a pin 88. As the pin gear is rotated, pin 88 enters one of the slots on the Geneva wheel 78, drives the Geneva wheel through the angular distance between adjacent slots and then exits from the slot. A semicircular dwell portion 89 on the pin gear 88 is positioned to enter a semicircular recess on the Geneva wheel 78 adjacent to a slot from which the pin 88 exits. When rotation of pin gear 82 is stopped with its semicircular dwell portion 89 in a Geneva wheel semicircular recess, as shown in FIG. 9, the Geneva wheel 78 is held stationary. The resistor support wheel 72 is in turn held stationary by the Geneva wheel.

A single pole, double throw limit switch 1LS is mounted adjacent the pin gear and has an operating arm 91 positioned to actuate the switch by being displaced from a position, shown in dotted lines in FIG. 9, to that shown in full lines. Pin 88 displaces the switch operating arm 91 to its full line position when the pin gear 82 is so positioned that the semicircular dwell portion 89 of the pin gear is located in a Geneva wheel recess. The resultant actuation of the switch 1LS opens limit switch contacts at 1LSA, see FIG. 11, deenergizing the indexing motor 83, and closes limit switch contacts at 1LSB, energizing the cut solenoid 57. When the pin gear is not so disposed, contacts 1LSB are open, the contacts 1LSA are closed, and the operating arm 91 is in the dotted line position of FIG. 9.

The electrical control circuit for the apparatus is shown in FIG. 11. An off-on switch 92 connects a power source 93 across a bus 94 and a bus 96. A cutter off-on switch 97 connects a cutter motor 98 across the busses 94 and 96 through a conventional motor start relay 95. The cutter motor 98 drives a flexible shaft which is coupled at 24, FIG. 3, to the cutting whel shaft 23 for driving the cutting wheel 21. A stop cycling switch 99 and a start cycling switch 101 are connected to a cycling relay 102 across busses 94 and 96. The cycling relay 102 operates a pair of normally open contacts 102A, in a line 103 connected across the contacts of the start cycling switch 101, and a pair of normally open contacts 102B in a line 104 between the bus 94 and a junction 105.

A pair of normally closed contacts 107A are located in a line 106 extending from the junction 105 to a junction 110. The junction 110 is connected by the limit switch 2LS of FIGS. 1, 2 and 5 to the indexing motor 83, FIG. 1, which is connected to the bus 96. A line 108 is connected to the junction 105. A pair of normally open contacts 107B and a normally closed switch 101′, mechanically connected to the start cycling switch 101 to be opened when switch 101 is closed, are located in the line 108. A line 109 runs from a junction 111, at the end of line 108, to the junction 110. The contacts 1LSA, which are a part of the limit switch 1LS, FIG. 9, and which are closed when the contacts 1LSB are open and open when contacts 1LSB are closed, are located in line 109. A circuit is completed between the junctions 105 and 110 through the lines 108 and 109 when the contacts at 107B, 101′ and 1LSA are all closed. The line 106 forms a bridge across the junctions 105 and 110 when the contacts at 107A are closed.

A sequence relay 107 is connected to the junction 111, in a line 112 which runs to the bus 96. The sequence relay 107 operates the contacts 107A and 107B. The contacts at 107A and 107B are "make before break" contacts. That is, during energization or deenergization of the relay 107 both sets of contacts are momentarily closed. At no time are both sets of contacts simultaneously open. Located in series in the line 112 between the junction 111 and the sequence relay 107 is a pair of normally closed contacts 113A.

A line 118, connected in parallel with the line 112, from the junction 111 to the bus 96 joins in series a test set relay 113, which operates the normally closed contacts 113A, with normally open contacts 117A and a known resistance 119. The test set relay 113 has a coil resistance which is high compared to the desired resistance of the resistor 11. The resistor is connected across the test set relay 113 when the notched portions of the electrically conductive fingers 66 and 66′, which are connected into line 118, contact the end caps 12 and 12′. The circuit is designed to operate the relay 113 when the resistance of resistor 11 is equal to the selected value, acting as a voltage divider. Other voltage divider arrangements may, of course, be substituted for the one depicted.

Also connected to the junction 111 are a pair of lines 114 and 116, in parallel with each other and with the line 118. The line 114 runs to the traverse motor 48, FIG. 1, the other side of which is connected to the bus 96. The limit switch 3LS of FIGS. 1, 2 and 5, is located in line 114 between the junction 111 and the traverse motor 48. A test command relay 117, which operates the normally open contacts 117A, is connected to the line 114 and the bus 96 across the traverse motor. The line 116 runs to bus 96 and has therein, in series, the contacts 1LSB and the cut solenoid 57 (FIG. 9) which operates the valve V in the pneumatic cylinder and piston assembly 56, FIG. 2.

In the operation of the apparatus, the off-on switch 92 is first closed, supplying power across bus 94 and bus 96. The cutter off-on switch 97 is next closed, energizing the cutter motor 98 through the motor start relay 95, commencing rotation of the cutting wheel 21.

Next, the start cycling switch 101 is closed. The cycling relay 102 is, thus, energized, closing the contacts at 102A and 102B. The line 103 continues to energize the cycling relay through closed contacts 102A, while the closing of contacts 102B supplies power across the junction 105 and the bus 96.

The cutting wheel support arm 27 is presently in a position pivoted about the bearing sleeve 42 away from the cutting position P. Thus, limit switch 2LS is closed and limit switch 3LS is open. Also, the pin gear 82 is in the dwell position shown in FIG. 9, the semicircular dwell portion 89 being located in a semicircular recess of the Geneva wheel 78, retaining the Geneva wheel momentarily fixed against rotation and holding the resistor support wheel 72 with a resistor 11′, which has just been cut, still retained in the cutting position P. The pin 88 of pin gear 82 holds the switch operating arm 91 in the full line position of FIG. 9. Thus, contacts 1LSB are closed and contacts 1LSA are open. The sequence relay 107 is presently deenergized, as it is open circuited at 1LSA and 107B, with the contacts 107A being closed to cause the line 106 to form a bridge between the junctions 105 and 110 across the open contacts 1LSA.

Since the contacts 107A and the limit switch 2LS are closed, the indexing motor 83 is energized. The pin gear 82 is, thus, immediately rotated by the drive train through the pulleys 86 and 87 and the belt 84. The pin 88 is rotated away from the switch operating arm 91, which returns to the dotted line position of FIG. 9. The limit switch contacts 1LSB are thereby opened, while the limit switch contacts 1LSA are closed. The closing of contacts 1LSA causes current to flow to junction 111 via line 109. The contacts at 1LSB and 3LS and the contacts 117A are presently open. Thus, the cut solenoid 57, the traverse motor 48 and the test command relay 117 remain deenergized. The sequence relay 107 is, however, energized through the normally closed contacts 113A. Contacts 107A are, thus, opened, but only after contacts 107B close, since the contacts are of the "make before break" type, as explained above. Current continues to flow to junction 111 via junction 105, line 108, closed contacts 107B and closed switch 101′. The line 109, the closed contacts 1LSA, the junction 110 and the closed limit switch 2LS provide a current path to continue the energization of the indexing motor 83.

The pin gear 82 continues to rotate. The pin 88 enters a slot in the Geneva wheel 78 and rotates the Geneva wheel to drive the resistor supporting wheel 72 and index a new resistor 11 into the cutting position P. The pin 88 then leaves the slot. The semicircular dwell portion 89 of the pin gear 82 thereupon engages a semicircular recess in the Geneva wheel and retains the Geneva wheel and the resistor supporting wheel 72 in this position. Meanwhile, the pin 88 again actuates the switch operating arm 91 to move it to the full line position of FIG. 9, closing the limit switch contacts 1LSB and opening the limit switch contacts 1LSA. The opening of the contacts 1LSA open circuits the indexing motor 83. The new resistor 11 is retained in the cutting position P, due to the nature of the motor 83, since coasting is substantially eliminated by its low speed operation and the use of a permanent magnet in the motor.

The closing of the contacts 1LSB energizes the cut solenoid 57 through junction 105 and line 108, the closed contacts at 107B, the closed switch 101', junction 111 and line 116. The valve V of the pneumatic cylinder and piston assembly 56 is actuated to pivot the cutting wheel support arm 27 toward the cutting position P against the influence of the springs 51 and 51'. As the arm 27 moves, the projecting portion 59 moves away from the limit switch 2LS, which opens, further isolating the indexing motor 83 from the power supply.

The pusher rods 62 and 62', extending forward from the cutting wheel support arm 27 then come into contact with the shoulders 68 and 68' on the fingers 66 and 66'. The fingers are pivoted by the pusher rods against the influence of springs 71 and 71', bringing the notched portions 69 and 69' into contact with the end caps 12 and 12' of the resistor in cutting position P. The notched portions 69 and 69' connect the resistor 11 into the line 118 through the electrically conductive fingers 66 and 66'.

The cutting wheel support arm 27 continues to pivot toward the cutting position P. The pusher rods 62 and 62' maintain the fingers 66 and 66' in position with the notched portions thereof contacting the resistor's end caps, while springs 63 and 63' are compressed to permit the continued pivoting of the arm 27. The projecting portion 59 of arm 27 then engages and closes the limit switch 3LS. The test command relay 117 is thereupon energized, closing the contacts at 117A which connect the resistor 11 and the test set relay 113 to junction 111, triggering the test set relay to begin reading the resistance across the end caps 12 and 12' of the resistor 11.

If the resistance of the resistor 11 is initially determined to be at least equal to the desired resistance, the test set relay will immediately open circuit the line 112 at the contacts 113A. The sequence relay 107 will, thus, be deenergized. The contacts 107A will close, while those at 107B will open. Since the contacts 1LSA will be open, the current flow to the junction 111 will cease. The cut solenoid 57 will be deenergized, so that the springs 51 and 51' will pivot the arm 27 and the cutting wheel 21 in a direction away from the cutting position P. The pusher rods 62 and 62' will be removed from the shoulders 68 and 68'. The springs 71 and 71' will then withdraw the fingers 66 and 66' from the resistor's end caps. The cessation of current flow to the junction 111 will deenergize the relays 117 and 113, so that contacts 117A will open and contacts 113A will close. The limit switch 3LS will open and the limit switch 2LS will then close. Indexing of another uncut resistor 11 to the cutting position will then commence.

If, on the other hand, the initial resistance reading across the end caps 12 and 12' is less than the desired value, the contacts 113A will remain closed. The cutting wheel 21 will contact the surface film 14 on the resistor 11 and will be drawn longitudinally along it as the traverse motor, now energized by the line 114, drives the pulleys 47, 44, 37 and 34, through the belts 46 and 36, and the shafts 38 and 33 to operate the traversing cam 32.

Cutting of the slab cut will continue until the test set relay 113 reads that the resistance across the end caps 12 and 12' of the resistor has reached the desired value. The contacts 113A will then open and the sequence relay 107 will be deenergized. The contacts at 107A will close and those at 107B will open, isolating the junction 111, which will be open circuited at 107B and 1LSA. The cut solenoid 57 will be deenergized and the springs 51 and 51' will pivot the cutting wheel support arm 27 to withdraw the cutting wheel 21 from the surface of the resistor. The fingers 66 and 66' will then be pivoted away from the end caps 12 and 12' by the springs 71 and 71'. The relays 117 and 113 will be deenergized, so that contacts 117A will open and contacts 113A will close. The limit switch 3LS will be opened and the limit switch 2LS closed by the projecting portion 59 of the arm 27. The closing of the limit switch 2LS, with contacts 107A now closed, will begin anothers indexing operation of the indexing motor 83, preparatory to cutting a new resistor 11.

Should the resistance of a resistor never reach the desired value, opening the contacts 113A, the indexing will occur upon the attending operator of the apparatus merely pressing the start cycling switch 101. The switch 101' will thereby be opened across its contacts. Since the contacts 1LSA are then open, the junction 111 will not receive current and the sequence relay 107 will be de-energized. Thus, the indexing will proceed as explained above.

The indexing of the resistor support wheel 72, however triggered, is designed to occur in intermittent fashion between successive dwell positions, shown in FIG. 9, in which the resistor support wheel is held fixed during cutting. Each time that the limit switch 2LS is closed by the cutting wheel support arm 27 pivoting away from the cutting position P, the indexing will commence, provided that the cycling relay 102 is still energized. The pin gear 82 will rotate through one full revolution, driving the Geneva wheel 78 through the angle between adjacent slots, and then stop in the FIG. 9, dwell position again when the pin 88 causes the closing of the contacts 1LSB and the opening of the contacts 1LSA. During this time, the resistor support wheel 72 will index one position along its periphery.

It is to be understood that the above-described apparatus is simply illustrative of one embodiment of the invention. Other cutting means may be used, such as an electric arc, a laser beam or a fluid stream containing abrasive particles. Other drive means, such as a gear train or chains and sprockets, may be substituted for the belt and pulley arrangement described. Many other modifications may be made without departing from the invention.

What is claimed is:

1. In an apparatus for making a slab cut in a carbon film deposited on a resistor;
   a bearing sleeve,
   an arm pivotally mounted on said bearing sleeve,
   a cutter mounted for rotary movement on and movement longitudinal to said arm,
   means for holding a resistor against movement while in position to be cut,
   means for measuring the resistance of said resistor in said holding means;
   means for pivoting said arm to move said cutter into engagement with the film of a held resistor,
   a cam follower connected to said cutter,
   a cam rotatably mounted on said arm for moving said cam follower to impart a longitudinal movement to said cutter,
   a drive shaft extending through said bearing sleeve,
   means for rotating said drive shaft,
   means for imparting said rotation of said drive shaft to said cam to impart said longitudinal movement to said cutter,
   means for rotating said cutter, and means actuated by the pivoting of said arm and responsive to a measurement of a predetermined resistance value for initiating operation of the means for rotating the drive shaft.

2. In an apparatus for making a slab cut in a conductive film deposited on a core,
- means for supporting and holding the core against movement while in position to be cut,
- a frame arm mounted for pivotal movement toward and away from the supported core,
- a pair of spaced contact means movably mounted for engagement with opposite ends of said supported core,
- a cutting wheel mounted for rotation on and longitudinal movement across said arm,
- means for continuously rotating said cutting wheel,
- means for pivoting said arm toward said core to first move said contact means into engagement with the ends of said supported core and then said cutting wheel into engagement with said film on said core,
- resistance measuring means conditioned to operate by the engagement of said contact means with said core for ascertaining the resistance value of said film as the cutting wheel traverses and cuts the film,
- means actuated by the further pivoting of said arm for imparting longitudinal movement to said cutting wheel and for initiating operation of said conditioned measuring means, and
- means actuated by the resistance measuring means ascertaining a predetermined value of resistance of said cut film for interrupting longitudinal movement of said cutting wheel and for pivoting the arm away from said supported core.

3. In an apparatus as defined in claim 2 wherein the spaced contact means each comprises,
- a movably mounted contact finger,
- first resilient means for urging said contact finger away from the associated end of the supported core,
- a pusher rod slidably mounted in the frame arm to engage and move the contact finger into contact with the associated end of said core, and
- second resilient means for urging said pusher rod to protrude from said frame arm with sufficient force to overcome the first resilient means and move the contact finger into engagement with the supported core.

4. Apparatus for making a slab cut in a film deposited on a surface portion of a resistor having a pair of end caps, which comprises:
- a resistor support for holding the resistor against movement while in position to be cut;
- a cutting blade supporting arm mounted for pivotal motion toward and away from said resistor support;
- a rotary cutting blade mounted on said arm for axial motion parallel to said resistor surface;
- drive means for rotating said cutting blade;
- a pair of electrically conductive fingers, each mounted for pivotal movement toward and away from an associated one of the end caps of said resistor on said support;
- means for biasing each finger pivoted away from its associated end cap;
- a pair of push rods projecting from said arm, each toward an associated one of said fingers;
- compression spring means for biasing each of said pusher rods a limited distance outwardly from said arm toward its associated finger;
- electrical testing means connected across said electrically conductive fingers for measuring the resistance of said resistor across said end caps;
- means for pivoting said arm toward said support, said pusher rods pivoting said fingers to contact said end caps, and for further pivoting said arm toward said support, compressing said compression spring means, to engage said rotary cutting blade with said film on said resistor;
- means, effective upon engagement of said cutting blade with said film, for moving said cutting blade along said resistor surface to cut a slab cut in said film; and
- means, effective when said fingers are in contact with said end caps, for pivoting said arm away from said support when said electrical testing means measures a resistance of at least a predetermined value to withdraw said cutting blade in a direction away from engagement with said film.

5. In an apparatus for successively making longitudinal cuts in surface films deposited on each of a plurality of resistors:
- a rotatable resistor support wheel supporting said resistors held against movement on said wheel at equally spaced positions thereabout;
- a rotary cutter;
- drive means for rotating said cutter;
- a pivot arm supporting said cutter for movement longitudinal to said arm;
- means for mounting said pivot arm to pivot said cutter into engagement with the film on a first resistor at a cutting position on said support wheel;
- means for pivoting said arm to move said cutter into engagement with said film and for pivoting said arm to withdraw said cutter from said film;
- means, effective upon said cutter engaging said first resistor, for moving said cutter longitudinal to said arm to cut a longitudinal cut in said surface film;
- a rotatable Geneva wheel having a plurality of equally spaced radial slots therein, connected to drive said resistor support wheel, moving said first resistor away from said cutting position and a second resistor to said cutting position when said Geneva wheel is rotated through a distance between adjacent ones of said slots;
- a rotatable pin gear having a pin extending outwardly therefrom positioned to enter one of said slots and rotate said Geneva wheel through said distance between adjacent slots during one rotation of said pin gear;
- an electric indexing motor connected to rotate said pin gear;
- a source of electrical energy;
- means, rendered effective by said arm pivoting to withdraw said cutter from said film, for electrically connecting said indexing motor to said energy source to rotate said pin gear; and
- means, rendered effective by said pin gear rotating through one rotation, for electrically disconnecting said motor from said energy source to terminate rotation of said pin gear.

6. An apparatus for successively making longitudinal cuts in surface films deposited on each of a plurality of resistors, as set forth in claim 5 wherein;
- said electrical connecting means comprises a circuit connecting said indexing motor and said energy source, said circuit including a normally open first switch mounted adjacent said arm in series between said motor and said sources, the arm contacting and closing said first switch when pivoted to withdraw said cutter from said film;
- said electrical disconnecting means comprises a normally closed second switch in said circuit mounted adjacent said pin gear in series with said first switch, said pin opening the second switch when said pin gear is rotated through one revolution;
- said circuit includes bridging means, effective at the closing of said first switch by said arm, for connecting said indexing motor with said energy source across said second switch, said indexing motor rotating said pin gear to remove said pin from said second switch, closing said normally closed second switch; and
- said circuit also includes means, effective upon the closing of said second switch, for rendering said bridging means ineffective to connect said motor with said energy source across the second switch, the subsequent opening of said second switch by said pin deenergizing said index motor.

7. An apparatus for successively making longitudinal cuts in surface films deposited on each of a plurality of resistors, as set forth in claim 6, which comprises:

contact means mounted adjacent said cutting position for engaging each of said resistors at said cutting position, said pivot arm moving said contact means into engagement with a resistor in said cutting position upon pivoting of said arm to move said cutter toward the film on said resistor, said contact means leading said pivot arm;

testing means for measuring the resistance of said resistor when said contact means engage the resistor; and means, respensive to a resistance measurement by said testing means of at least a predetermined value, for operating said pivoting means to withdraw said cutter in a direction away from said film.

References Cited

UNITED STATES PATENTS

| | | | |
|---|---|---|---|
| 3,264,787 | 8/1966 | Anderson et al. | 51—37 |
| 3,046,706 | 7/1962 | Price | 51—165.04 |
| 2,884,746 | 5/1959 | Rus et al. | 51—37 |

JAMES L. JONES, *Primary Examiner.*

U.S. Cl. X.R.

51—53, 108, 165